(12) United States Patent
Zheng et al.

(10) Patent No.: US 12,259,276 B2
(45) Date of Patent: Mar. 25, 2025

(54) RECONSTRUCTING LIGHT WAVELENGTH SPECTRUM WITH THIN-FILM DEVICE

(71) Applicant: AMS INTERNATIONAL AG, Jona (CH)

(72) Inventors: Ruitao Zheng, Eindhoven (NL); James Archibald, Eindhoven (NL)

(73) Assignee: AMS INTERNATIONAL AG, Jona (CH)

( * ) Notice: Subject to any disclaimer, the term of this patent is extended or adjusted under 35 U.S.C. 154(b) by 14 days.

(21) Appl. No.: 17/619,608

(22) PCT Filed: Jul. 15, 2020

(86) PCT No.: PCT/EP2020/070059
§ 371 (c)(1),
(2) Date: Dec. 16, 2021

(87) PCT Pub. No.: WO2021/009264
PCT Pub. Date: Jan. 21, 2021

(65) Prior Publication Data
US 2022/0299367 A1 Sep. 22, 2022

Related U.S. Application Data

(60) Provisional application No. 62/874,588, filed on Jul. 16, 2019.

(51) Int. Cl.
*G01J 3/28* (2006.01)
*G01J 3/12* (2006.01)
*G01J 3/51* (2006.01)

(52) U.S. Cl.
CPC ............. *G01J 3/2803* (2013.01); *G01J 3/12* (2013.01); *G01J 3/513* (2013.01); *G01J 2003/1204* (2013.01); *G01J 2003/123* (2013.01)

(58) Field of Classification Search
CPC .......... G01J 2003/123; G01J 2003/516; G02B 5/201
See application file for complete search history.

(56) References Cited

U.S. PATENT DOCUMENTS 4,534,620 A * 8/1985 Gale ..................... G02B 5/201
359/582
2004/0218187 A1 * 11/2004 Cole ................. H01L 27/14621
257/E31.115

(Continued)

OTHER PUBLICATIONS

OpenFilters: open-source software for the design, optimization, and synthesis of optical filters. Applied optics, 47(13), pp. C219-C230 (Year: 2008).*

(Continued)

*Primary Examiner* — Uzma Alam
*Assistant Examiner* — Mohamed Doumbia
(74) *Attorney, Agent, or Firm* — Tarolli, Sundheim, Covell & Tummino LLP

(57) ABSTRACT

A spectrometer device includes: a substrate including multiple light detector elements; a first filter layer on the substrate, in which the first filter layer includes multiple groups of filter stacks, each filter stack in the first filter layer including multiple dielectric films of alternating refractive index; and a second filter layer on the first filter layer, in which the second filter layer includes multiple groups of filter stacks, each filter stack in the second filter layer including multiple dielectric films of alternating refractive index, in which each filter stack in the second filter layer is aligned with both a corresponding filter stack in the first filter layer and a corresponding light detector element to define a respective photodetector channel, and in which each photodetector channel includes a different optical transmission spectrum.

14 Claims, 6 Drawing Sheets

(56) References Cited

U.S. PATENT DOCUMENTS

| | | | |
|---|---|---|---|
| 2009/0168181 A1* | 7/2009 | Su | G02B 1/105 |
| | | | 359/586 |
| 2014/0151575 A1* | 6/2014 | Hillmer | H01L 27/14685 |
| | | | 250/226 |
| 2014/0210031 A1 | 7/2014 | Hendrix | |
| 2018/0084167 A1* | 3/2018 | Qian | G01J 3/0208 |
| 2019/0086259 A1* | 3/2019 | Cho | G01J 3/0291 |
| 2019/0088234 A1 | 3/2019 | Xu | |

OTHER PUBLICATIONS

Larouche, 2008. OpenFilters: open-source software for the design, optimization, and synthesis of optical filters. Applied optics, 47(13), pp. C219-C230 (Year: 2008).*

International Search Report and Written Opinion for corresponding PCT Patent Application No. PCT/EP2020/070059 dated Sep. 17, 2020.

Larouche S et al: "OpenFilters: open-source software for the design, optimization, and synthesis of optical filters" Applied Optics, Optical Society of America, Washington, DC, US, vol. 47, No. 13, May 2, 2008 (May 2, 2008), pp. C219-C230, XP001514443, ISSN: 0003-6935, DOI: 10.1364/AO.47.00C219.

* cited by examiner

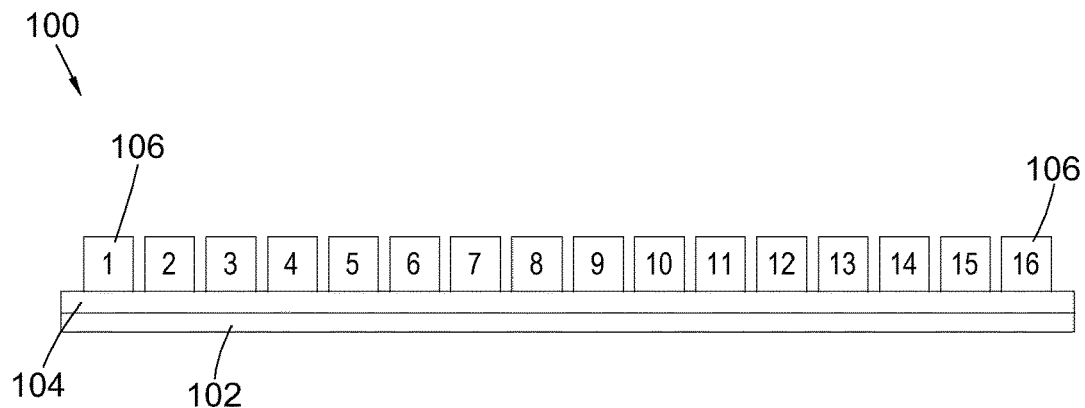
Fig. 1
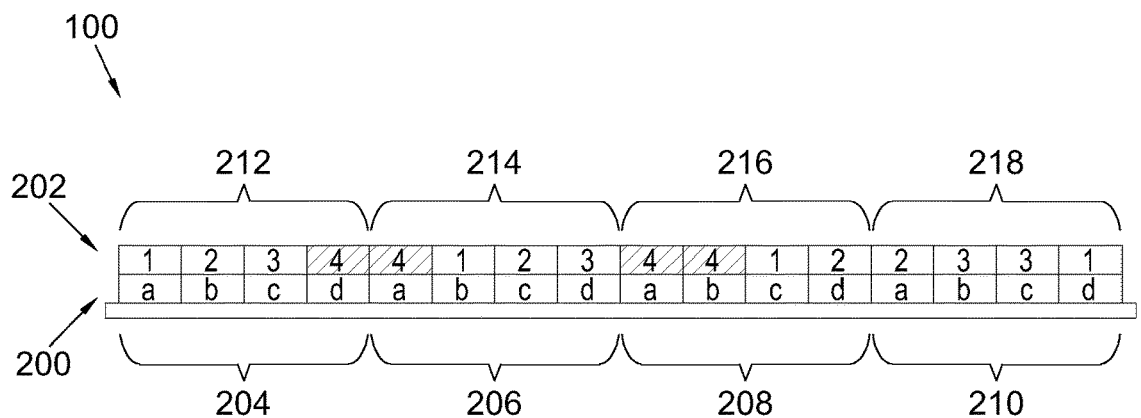
Fig. 2
| Film Stack number | Layer structure |
|---|---|
| Film stack a | SiO2/TiO2 |
| Film stack b | TiO2/SiO2 |
| Film stack c | SiO2/TiO2 |
| Film stack d | TiO2/SiO2 |
| Film stack 1 | SiO2/TiO2 |
| Film stack 2 | TiO2/SiO2 |
| Film stack 3 | SiO2/TiO2 |
| Film stack 4 | TiO2/SiO2 |
Fig. 3

RECONSTRUCTING LIGHT WAVELENGTH SPECTRUM WITH THIN-FILM DEVICE

RELATED APPLICATIONS

The present invention is a U.S. National Stage under 35 USC 371 patent application, claiming priority to Serial No. PCT/EP2020/070059, filed on Jul. 15, 2020; which claims priority from U.S. Provisional Application No. 62/874,588 filed on Jul. 16, 2019; the entirety of which is incorporated herein by reference.

TECHNICAL FIELD

The present disclosure relates to reconstructing light wavelength spectra with thin-film devices.

BACKGROUND

A light spectrum may include a distribution of radiant energy such as ultraviolet (UV), visible (VIS) or infrared (IR) light. A spectrometer is an instrument designed for measurement of a light spectrum. Various applications rely on measuring light wavelength spectra including, e.g., environmental analyses, industrial monitoring, color measurement and pharmacology.

SUMMARY

In general, in some aspects, the present disclosure covers a light spectrum measurement device that includes an array of light detector elements. Each detector element in the array is covered by a corresponding set of multiple filter stacks. Together, each set of multiple filter stacks and the corresponding detector over which the stacks are formed define a corresponding photodetector channel with a predefined optical transmission spectrum. In this way, multiple photodetector channels can be provided, in which each channel has a different optical transmission spectrum. In some cases, the optical transmission spectra of all the channels can be matched to a desired combination of wavelength spectra.

In general, in some aspects, the subject matter of the present disclosure may be embodied in a spectrometer device including: a substrate including multiple light detector elements; a first filter layer on the substrate, in which the first filter layer includes multiple groups of filter stacks, each filter stack in the first filter layer including multiple dielectric films of alternating refractive index; and a second filter layer on the first filter layer, in which the second filter layer includes multiple groups of filter stacks, each filter stack in the second filter layer including multiple dielectric films of alternating refractive index, in which each filter stack in the second filter layer is aligned with both a corresponding filter stack in the first filter layer and a corresponding light detector element to define a respective photodetector channel, and in which each photodetector channel includes a different optical transmission spectrum.

Implementations of the spectrometer device may include one or more of the following features. For example, in some implementations, each group of filter stacks in the first filter layer includes a same first multiple of different filter stacks, in which each group of filter stacks in the second filter layer includes a same second multiple of different filter stacks. Each filter stack within each first multiple of different filter stacks may include a same number of stacked dielectric films, and is formed with the same dielectric film material, and each filter stack within each second multiple of different filter stacks may include a same number of stacked dielectric film, and is formed with the same dielectric film material. Each filter stack within the first multiple of different filter stacks may have different dielectric film thicknesses from the other filter stacks within the first multiple of different filter stacks, and each filter stack within the second multiple of different filter stacks may have different dielectric film thicknesses from the other filter stacks within the second multiple of different filter stacks. The dielectric film thicknesses of each filter stack in the first filter layer and in the second filter layer may be refined for at least one predefined spectral source. The multiple groups of filters stacks of the second filter layer may include multiple pluralities of identical filter stacks, in which the multiple groups of filter stacks of the first filter layer include multiple pluralities of identical filter stacks.

In some implementations, each filter stack within the first filter layer consists of two dielectric film layers. The two dielectric film layers of each filter stack within the first filter layer include a low refractive index layer and a high refractive index layer.

In some implementations, each filter stack within the second filter layer consists of two dielectric films. The two dielectric films of each filter stack within the second filter layer include a low refractive index layer and a high refractive index layer.

In general, in some aspects, the subject matter of the present disclosure may include methods of forming a spectrometer device, the methods including: predefining multiple filter stacks, in which each filter stack includes multiple dielectric films, each dielectric film of the multiple dielectric films having a corresponding initial film thicknesses; updating a film thickness of each dielectric film of each filter stack in a spectrometer model, in which the spectrometer model includes the multiple filter stacks arranged into a first filter layer and a second filter layer on the first filter layer, in which each filter stack within the second filter layer is aligned with a corresponding filter stack in the first filter to define respective channels; fabricating the spectrometer device according to the spectrometer model including the updated dielectric film thicknesses.

Implementations of the methods may include one or more of the following features. For example, in some implementations, fabricating the spectrometer device includes: providing a substrate including multiple light detector elements; forming the first filter layer on the substrate; and forming the second filter layer above the first filter layer, in which each filter stack in the second filter layer is aligned with both a corresponding filter stack in the first filter layer and a corresponding light detector element to define a respective photodetector channel, and in which each photodetector channel is configured to have a different optical transmission spectrum.

Each photodetector channel may be configured to have a different optical transmission spectrum. Forming the first filter layer may include: forming multiple first filter stacks, each first filter stack consisting of the same structure; and after forming the multiple first filter stacks, forming multiple second filter stacks, each second filter stack consisting of the same structure as each other second filter stack and including a different structure from the multiple first filter stacks.

Forming the first filter layer may include: after forming the multiple second filter stacks, forming multiple third filter stacks, each third filter stack consisting of the same structure as each other third filter stack and including a different structure from the multiple first filter stacks and the multiple second filter stacks; and after forming the multiple third filter stacks, forming multiple fourth filter stacks, each fourth filter stack consisting of the same structure as each other fourth filter stack and including a different structure from the multiple first filter stacks, the multiple second filter stacks, and the multiple third filter stacks. Forming the second filter layer may include: forming multiple third filter stacks, each third filter stack consisting of the same structure as each other third filter stack and including a different structure from the multiple first filter stacks and the multiple second filter stacks, in which each third filter stack is arranged on a different filter stack structure of the first filter stack layer; and after forming the multiple third filter stacks, forming multiple fourth filter stacks, each fourth filter stack consisting of the same structure as each other fourth filter stack and including a different structure from the multiple first filter stacks, the multiple second filter stacks, and the multiple third filter stacks, in which each fourth filter stack is arranged on a different filter stack structure of the first filter stack layer.

In some implementations, updating the thickness of each dielectric film of each filter stack in the spectrometer model includes: selecting a source transmission spectra; and refining the thickness of each dielectric film of each filter stack based on the selected source transmission spectra.

In some implementations, each filter stack of the predefined multiple of filter stacks consists of two dielectric films. The two dielectric films of each filter stack within the second filter layer include a low refractive index layer and a high refractive index layer.

The different implementations and aspects of the present disclosure can have various advantages. For example, in some implementations, the devices and techniques disclosed herein do not require the use of dispersive elements, such as gratings, interferometers, or other complex optics, thus allowing the fabrication of a more compact spectrometer. For instance, in some cases, the techniques disclosed herein may allow the fabrication of a spectrometer that can be used in smart mobile devices, such as smart phones. In some implementations, the devices disclosed herein do not have special requirements for light to have specific angles of incidence. In some implementations, the techniques disclosed herein offer a simplified fabrication process by having channels share certain filter stacks.

The details of one or more embodiments are set forth in the accompanying drawings and the description below. Other features and advantages will be apparent from the description, the drawings, and the claims.

BRIEF DESCRIPTION OF THE DRAWINGS

FIG. 1 is a schematic illustrating a side view of an exemplary spectrometer device.

FIG. 2 is a schematic illustrating a side view of the exemplary spectrometer.

FIG. 3 is a diagram illustrating an exemplary film stack structure for each film stack of the device of FIG. 2.

DETAILED DESCRIPTION

Figure 4:
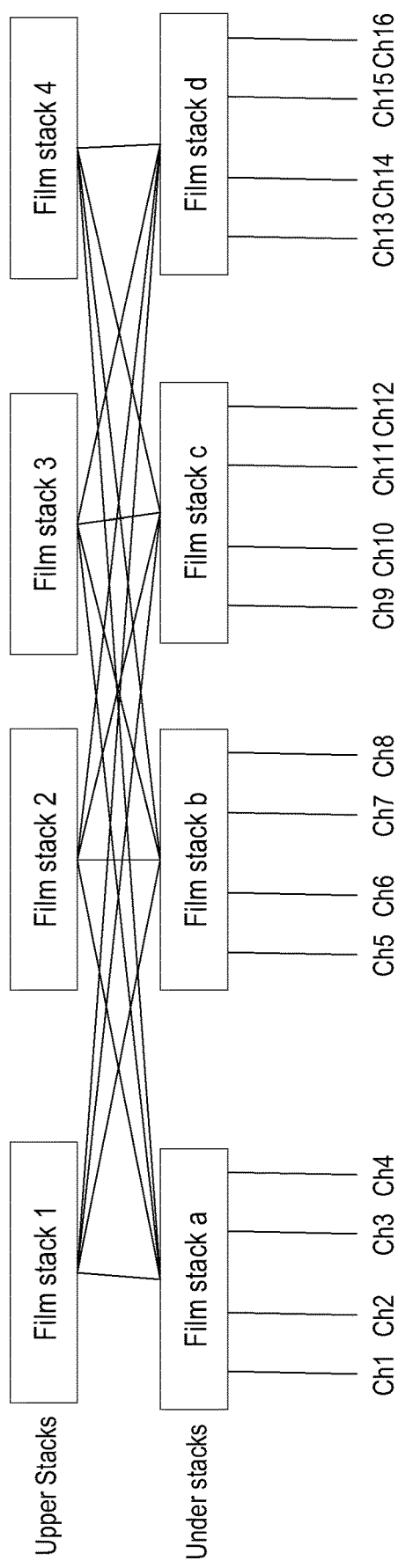
FIG. 4 is a diagram illustrating an exemplary multiplexing of film stack structures for the a spectrometer device.

FIG. 1 is a schematic illustrating a side view of an exemplary spectrometer device 100 according to the present disclosure. The device 100 includes a substrate 102. The substrate 102 may include multiple light detector elements 104. For instance, the substrate 102 may be a semiconductor substrate such as silicon, in which multiple silicon based photodetector elements are formed, or the substrate may be silica. The light detector elements 104 may be formed in or on substrate 102. The light detector elements 104 may be configured to detect light in a wavelength range from about 400 nm to about 1100 nm, among other wavelength ranges.

The light detector elements 104 are arranged in an array on the substrate 102. Multiple light filter stacks are formed in front of the light detecting surface of each detector element 104 to define different photodetector channels 106, numbered 1-16 in FIG. 1. The filter stacks within each channel 106 may be designed so that each channel 106 exhibits a different optical transmission spectrum.

Though the series of photodetector channels 106 are illustrated in FIG. 1 as being arranged in a linear array, the photodetector channels 106 may be positioned in any desirable arrangement including two-dimensional arrays. For instance, in the case of a spectrometer according to the present disclosure having 16 different photodetector channels 106, the channels 106 may be arranged in a 1×16 array, a 2×8 array, or a 4×4 array, among other configurations.

FIG. 2 is a schematic illustrating a side view of the exemplary spectrometer device 100 with additional detail regarding the makeup of the channels 106. In particular, in the example device 100 shown in FIG. 2, each photodetector channel 106 is constituted by a corresponding light detector element 104, a first filter stack (e.g., one of filters stacks a-d) from a first filter layer (200), and a second filter stack (e.g., one of filter stacks 1-4) from a second filter layer 202. Stated another way, the spectrometer device 100 includes a substrate including an array of light detector elements 104, a first filter layer 200 including a first set of filter stacks (stacks a-d), and a second filter layer 202 including a second set of filter stacks (stacks 1-4), in which each filter stack in the second filter layer 202 is aligned with both a corresponding filter stack in the first filter layer 200 and a corresponding light detector element 104 to define a respective photodetector channel, such that each photodetector channel exhibits a different optical transmission spectrum.

Each of the filter stacks (stacks a-d and stacks 1-4) in both the first filter layer 200 and in the second filter layer 202 includes multiple dielectrics films of alternating refractive index stacked on one another. For instance, each of the filter stacks (a-d, 1-4) may be arranged as a stack that includes 2, 3, 4, 5, 6, 7, or 8 thin-film dielectric layers of alternating refractive index, though other number of dielectric layers may also be possible. In a particular example, each of the filter stacks (a-d, 1-4) is a two-layer stack including a first layer of material (e.g., $SiO_2$, $MgF_2$) of a first refractive index (e.g., a low refractive index) and a second layer of material (e.g., $TiO_2$, $Ta_2O_5$, or $Nb_2O_5$) of a second different refractive index (e.g., a high refractive index), such as shown in FIG. 3. The thickness and position of the layers within each stack (e.g., whether the dielectric thin film is a bottommost layer, an uppermost layer, or an intervening layer) may depend on the design of the filter stack. Thus, each filter stack of the device 100 may have a different design from the other filter stacks of the device 100. For instance, stack "a" may have a first layer of $SiO_2$ at a thickness of 100 nm and a second layer of $TiO_2$ at a thickness of 50 nm on top of the first layer in stack "a," stack "b" may have a first layer of $TiO_2$ at a thickness of 25 nm, and a second layer of $SiO_2$ at a thickness of 125 nm on top of the first layer in stack "b," stack "1" may have a first layer of $SiO_2$ at a thickness of 115 nm and a second layer of $TiO_2$ at a thickness of 35 nm on top of the first layer in stack "1," and stack "2" may have a first layer of $TiO_2$ at a thickness of 10 nm, and a second layer of $SiO_2$ at a thickness of 140 nm on top of the first layer in stack "2." Other variations for any of stacks a-d and 1-4 are also possible. The thickness of each layer in the stacks may be optimized for better performance on spectra reconstruction. Thus, in the example of FIG. 2, 16 channel filters with different spectral responses may be formed by optimizing 8 filter stacks with 2-layers each.

As shown in FIG. 2, each filter layer contains a different group of filter stacks. For example, the first filter layer 200 includes a group of filter stacks a-d, and the second filter layer 202 includes a different group of filter stacks 1-4. In general, in some implementations, the total number of channels, M, in the device is determined based on the product of the number, L, of filter stacks within the first group and the number, J, of filter stacks within the second group. By combining L stacks and J stacks, the number of channels, M, can be expressed as $M=L \times J$. In this way, increasing the number of filters within each group leads to an increase in the number of channels with a distinct spectral response, improving the fidelity of the spectrometer device. So, for instance, in the present example, the total number of filter stacks in the first group of stacks represented in the first filter layer is 4, whereas the total number of filters stacks in the second group of stacks represented in the second filter layer is also 4, leading to a total number of channels of M=16. Though 4 different filters stacks are used in the first filter layer 200 and 4 different filter stacks are used in the second filter layer 202, other numbers of filter stacks in a group also could be used such as, e.g., 2 different filter stacks in group, 3 different filter stacks in a group, or 5 different filter stacks in a group.

The foregoing channel configuration thus requires that the groups of filter stacks in each filter layer be formed more than once. For instance, in the example shown in FIG. 2, the filter stack group a-d is formed four different times as groups 204, 206, 208, and 210. Similarly, the filter stack group 1-4 is formed four different times as groups 212, 214, 216, and 218. Stated another way, each filter stack configuration within the first group (e.g., each of stacks a-d) is provided four times within the first filter layer 200 underneath a different corresponding filter stack configuration from the second group (e.g., stacks 1-4). For instance, as shown in FIG. 4, for a first filter layer 200 formed using a first group of film stacks a-d and a second filter layer 202 formed using a second group of film stacks 1-4, the first film stack "a" will be the bottom film stack for each of film stacks "1," "2," "3," and "4" forming, together with the underlying detector elements, channels 1-4 of the spectrometer device, respectively. Similarly, the second film stack "b" will be the bottom film stack for each of film stacks "1," "2," "3," and "4" forming, together with the underlying detector elements, channels 5-8 of the spectrometer device, respectively. Similarly, the third film stack "c" will be the bottom film stack for each of film stacks "1," "2," "3," and "4" forming, together with the underlying detector elements, channels 9-12 of the spectrometer device, respectively. Similarly, the fourth film stack "d" will be the bottom film stack for each of film stacks "1," "2," "3," and "4" forming, together with the underlying detector elements, channels 13-16 of the spectrometer device, respectively.

Figure 5:
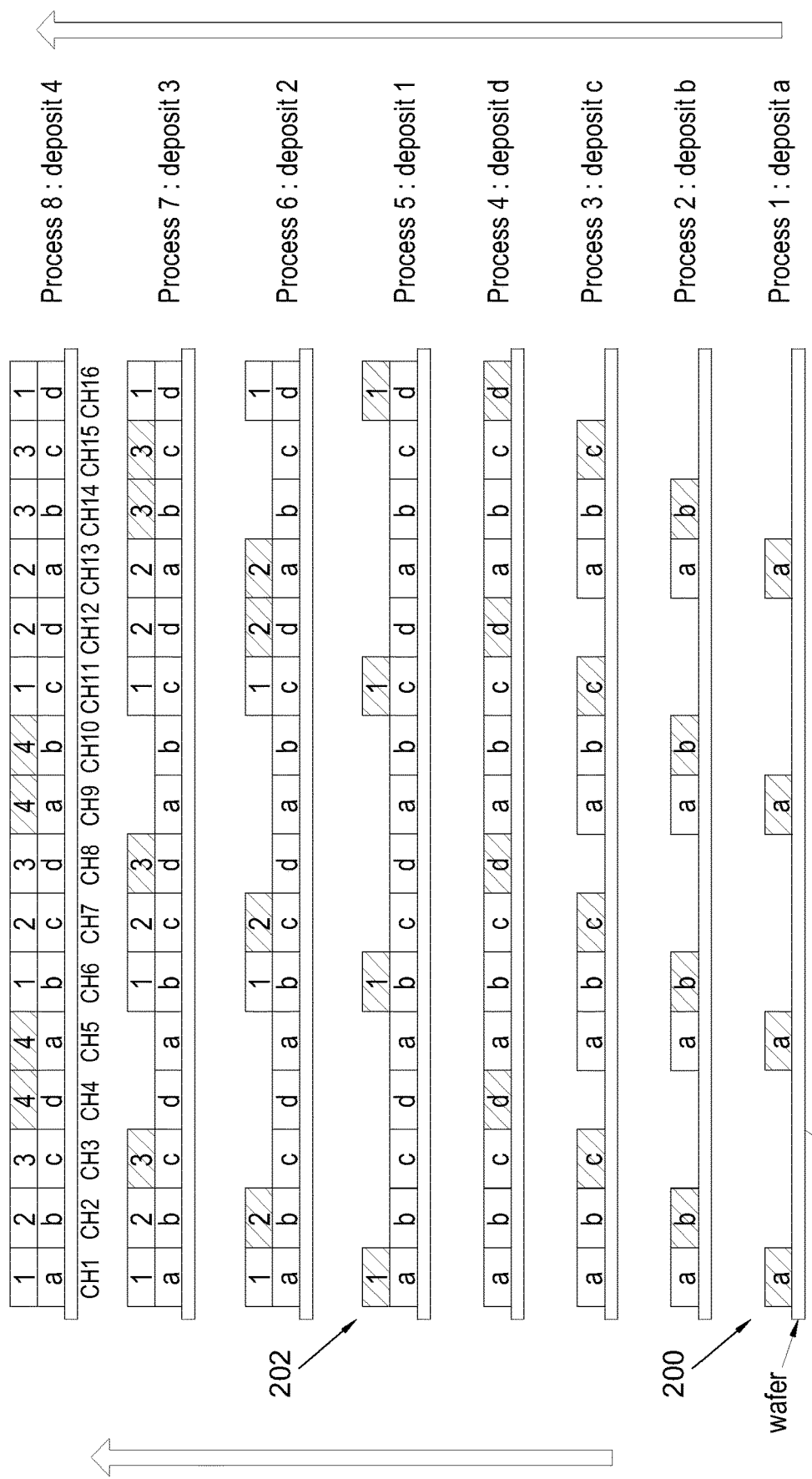
FIG. 5 is a schematic that illustrates an exemplary fabrication process for the device.

An advantage of the spectrometer structure using the different filter layers with different filter stack groups is that it offers a simplified fabrication process, since multiple identical filter stacks may be formed at the same time. FIG. 5 is a schematic that illustrates an exemplary fabrication process for the device 100 shown in FIG. 2. Similar fabrication steps may be followed for other device designs and may need to be adjusted based on the number of filter stacks and/or filter layers used. First, a substrate 102 is provided. The substrate 102 includes multiple detector elements (e.g., photodetector elements), which are omitted here for clarity. Then, starting at the bottom of FIG. 5 at "Process 1," a first set of identical filter stacks (e.g., filter stack "a") that will be part of the first filter layer 200 is formed on substrate 102. Each filter stack within the first set of filter stacks may be equally spaced apart as shown in FIG. 5, may be unequally spaced, or may be positioned directly adjacent to each other. Each filter stack within the first filter layer that is formed on the substrate 102 should be aligned over a corresponding detector element. Since each filter stack "a" is identical in its configuration (e.g., each filter stack has the same number of layers, the same material for each layer, and the same thickness for each layer and same total stack thickness), all of the filter stacks "a" may be fabricated at the same time. For instance, stacks "a" may be fabricated using a lift-off process, where a layer of photosensitive resist is firs provided on substrate 102, then defined to create openings in the regions where the stacks "a" will be formed. Subsequently, the different layers of stacks "a" may be deposited in succession on the resist layer. For instance, a first dielectric layer of $SiO_2$ may be deposited followed by a second layer of $TiO_2$. Following deposition, the resist may be removed, which also removes the dielectric film in regions where stack "a" is not to be formed. After forming the first set of filter stacks, a second set of identical filter stacks (e.g., filter stack "b") from the first filter layer 200 is formed on substrate 102 in "Process 2." As with the first set of filter stacks, the second set of filter stacks may be equally spaced apart, may be unequally spaced, or may be positioned directly adjacent to each other. Each filter stack within the second filter layer that is formed on the substrate 102 should be aligned over a corresponding detector element. Since each filter stack "b" is identical in its configuration (e.g., each filter stack has the same number of layers, the same material for each layer, and the same thickness for each layer and same total stack thickness), all of the filter stacks "b" may be fabricated at the same time, similar to the first set of filter stacks, e.g., using deposition and lift-off processes.

After forming the second set of filter stacks, a third set of identical filter stacks (e.g., filter stack "c") from the first filter layer 200 is formed on substrate 102 in "Process 3." As with the first and second sets of filter stacks, the third set of filter stacks may be equally spaced apart, may be unequally spaced, or may be positioned directly adjacent to each other. Each filter stack within the third filter layer that is formed on the substrate 102 should be aligned over a corresponding detector element. Since each filter stack "c" is identical in its configuration (e.g., each filter stack has the same number of layers, the same material for each layer, and the same thickness for each layer and same total stack thickness), all of the filter stacks "c" may be fabricated at the same time, similar to the first and second sets of filter stacks, e.g., using deposition and lift-off processes.

After forming the third set of filter stacks, a fourth set of identical filter stacks (e.g., filter stack "d") from the first filter layer 200 is formed on substrate 102 in "Process 4." As with the first, second and third set of filter stacks, the fourth set of filter stacks may be equally spaced apart, may be unequally spaced, or may be positioned directly adjacent to each other. Each filter stack within the fourth filter layer that is formed on the substrate 102 should be aligned over a corresponding detector element. Since each filter stack "d" is identical in its configuration (e.g., each filter stack has the same number of layers, the same material for each layer, and the same thickness for each layer and same total stack thickness), all of the filter stacks "d" may be fabricated at the same time, similar to the first set of filter stacks, e.g., using deposition and lift-off processes.

After forming the fourth set of filter stacks, a fifth set of identical filter stacks (e.g., filter stack "1") from the second filter layer 202 is formed on substrate 102 in "Process 5." Each filter stack within the fifth set is formed over a different filter stack configuration of the first filter layer 200. For instance, as shown in FIG. 5, a first one of the filter stacks "1" is formed over filter stack "a," a second one of the filter stacks "1" is formed over filter stack "b," a third one of the filter stacks "1" is formed over filter stack "c," and a fourth one of the filter stacks "1" is formed over filter stack "d." Since each filter stack "1" is identical in its configuration (e.g., each filter stack has the same number of layers, the same material for each layer, and the same thickness for each layer and same total stack thickness), all of the filter stacks "1" may be fabricated at the same time, similar to the first set of filter stacks, e.g., using deposition and lift-off processes.

After forming the fifth set of filter stacks, a sixth set of identical filter stacks (e.g., filter stack "2") from the second filter layer 202 is formed on substrate 102 in "Process 6." Each filter stack within the sixth set is formed over a different filter stack configuration of the first filter layer 200. For instance, as shown in FIG. 5, a first one of the filter stacks "2" is formed over filter stack "a," a second one of the filter stacks "2" is formed over filter stack "b," a third one of the filter stacks "2" is formed over filter stack "c," and a fourth one of the filter stacks "2" is formed over filter stack "d." Since each filter stack "2" is identical in its configuration (e.g., each filter stack has the same number of layers, the same material for each layer, and the same thickness for each layer and same total stack thickness), all of the filter stacks "2" may be fabricated at the same time, similar to the first set of filter stacks, e.g., using deposition and lift-off processes.

After forming the sixth set of filter stacks, a seventh set of identical filter stacks (e.g., filter stack "3") from the second filter layer 202 is formed on substrate 102 in "Process 7." Each filter stack within the seventh set is formed over a different filter stack configuration of the first filter layer 200. For instance, as shown in FIG. 5, a first one of the filter stacks "3" is formed over filter stack "a," a second one of the filter stacks "3" is formed over filter stack "b," a third one of the filter stacks "3" is formed over filter stack "c," and a fourth one of the filter stacks "3" is formed over filter stack "d." Since each filter stack "3" is identical in its configuration (e.g., each filter stack has the same number of layers, the same material for each layer and same total stack thickness), all of the filter stacks "3" may be fabricated at the same time, similar to the first set of filter stacks, e.g., using deposition and lift-off processes. After forming the seventh set of filter stacks, an eighth set of identical filter stacks (e.g., filter stack "4") from the second filter layer 202 is formed on substrate 102 in "Process 8," thus completing the device 100. Each filter stack within the eighth set is formed over a different filter stack configuration of the first filter layer 200. For instance, as shown in FIG. 5, a first one of the filter stacks "4" is formed over filter stack "a," a second one of the filter stacks "4" is formed over filter stack "b," a third one of the filter stacks "4" is formed over filter stack "c," and a fourth one of the filter stacks "4" is formed over filter stack "d." Since each filter stack "4" is identical in its configuration (e.g., each filter stack has the same number of layers, the same material for each layer, and the same thickness for each layer and same total stack thickness), all of the filter stacks "4" may be fabricated at the same time, similar to the first set of filter stacks, e.g., using deposition and lift-off processes.

Designing the spectrometer may include first selecting a set of target spectra to be measured and, additionally, predefining a set of film stacks (e.g., stacks a-d and stacks 1-4) to have an initial thickness. Then, based on the pre-defined structure, an iteration algorithm is applied (e.g., a least squares algorithm) to reconstruct the spectra. The iteration algorithm may evaluate the reconstructed spectral response of the channels against the selected target spectra. That is, the performance of the film stacks can be evaluated by deriving the difference between the reconstructed spectra and the target spectra. When the difference between the reconstructed spectra and the target spectra is above a threshold, one or more optimization algorithms may be applied to the design to adjust the film stacks to achieve the best reconstruction performances while searching for the minimum value of difference between reconstructed spectra and target spectra. For instance, an optimization algorithm may include a genetic algorithm.

An example of the design process for a spectrometer device according to the present disclosure will now be described. Multiple groups of filter stacks (e.g., a first group having L filter stacks, $S^1$, of two or more thin film layers and a second group having J filter stacks, $S^2$, of two or more thin film layers) are predefined for a spectrometer device model, namely, $S_1^1, S_2^1, \ldots, S_L^1$, with refractive index $[n_1^1, n_2^1, \ldots, n_L^1]$ and initial film thickness $[d_1^1, d_2^1, \ldots, d_L^1]$ $S_1^2, S_2^2, \ldots, S_J^2$, with refractive index $[n_1^2, n_2^2, \ldots, n_J^2]$ and initial film thickness $[d_1^2, d_2^2, \ldots, d_J^2]$ Though two groups of filter stacks are used in the example above, additional groups of filter stacks could be used, which may lead to increased complexity in the design process due to introduction of more variables. By selecting one filter stack from each group, a single channel of the spectrometer device model may be formed by cascading the selected two stacks, as described herein with respect to FIGS. 1-4. So the film structure of each channel will be $[S_{ii}^1, S_{jj}^2]$, where ii=1, 2, . . . , L and jj=1, 2, . . . , J. As a result, total number of channels M of a representative spectrometer device model will be, $$M = L \times J \quad (1)$$

As explained herein, by combining the filter stacks in this manner, there are L channels sharing the same filter stack from group 2 and J channels sharing the same filter stack from group 1, leading to a simplification of the fabrication process for the M channels given that multiple filter stacks can be fabricated simultaneously. For instance, fabrication of L×J channels may only require L+J process steps.

The spectral response of a multilayer thin film system may be calculated from the layer structure (i.e., the refractive index and thickness of each layer) by using the transfer matrix method. With the initial film structure of the M channels defined, the transmission spectral response of each channel $[F_1(\lambda), F_2(\lambda), \ldots, F_M(\lambda)]$ of the model is determined for each predefined wavelength, $\lambda$, and each channel according to the film stack structure of the channel, i.e., based on the refractive index and thickness of the films that form the channel. For most practice, refractive index is typically fixed once the material is selected, and the spectral response of each channel, $[F_1(\lambda), F_2(\lambda), \ldots, F_M(\lambda)]$, may be determined by thickness of the dielectric thin film layers for each channels, e.g., L+J parameters.

In general, the total number, N, of wavelengths for which the transmission spectral response is determined for each channel is based on the resolution desired, and therefore N represents the target resolution. The value of N may be, e.g., 5, 10, 50, 100, 200, 300, 400, 500, 600, 700, 800, 900 or 1000, among other values.

For instance, a series of spectra $x(\lambda)$ is selected as the target spectra to be measured by this spectrometer. Thus, based on spectral response of initial film stacks structure $[F_1(\lambda), F_2(\lambda), \ldots, F_M(\lambda)]$, multiplexed intensity of light for each channel, $P_i$, which is a sum of intensity at each wavelength from a minimum wavelength $\lambda_{min}$ to a maximum wavelength $\lambda_{max}$, $$P_i = \sum_{\lambda=\lambda_{min}}^{\lambda_{max}} [F_i(\lambda)x(\lambda)] \tag{2}$$

where i=1, 2, ..., M

A randomly generated matrix a of size (N×M) may be expressed as $$\alpha = \begin{bmatrix} \alpha_{1,1} & \cdots & \alpha_{1,M} \\ \vdots & \ddots & \vdots \\ \alpha_{N,1} & \cdots & \alpha_{N,M} \end{bmatrix} \tag{3}$$

And a sensing matrix A may be expressed as $$A = \begin{bmatrix} \alpha_{1,1} & \cdots & \alpha_{1,M} \\ \vdots & \ddots & \vdots \\ \alpha_{N,1} & \cdots & \alpha_{N,M} \end{bmatrix} \times \begin{bmatrix} F_1 \\ \vdots \\ F_M \end{bmatrix} \tag{4}$$

Sensing matrix A then can be calculated from a spectral response of each channel, which, in turn is determined based on the film thickness and refractive index of each layer in a corresponding channel.

For instance, measurement of the target spectra may include finding a suitable x to meet following linear relationship $$P = Ax \tag{5}$$

where $$P = \begin{bmatrix} \alpha_{1,1} & \cdots & \alpha_{1,M} \\ \vdots & \ddots & \vdots \\ \alpha_{N,1} & \cdots & \alpha_{N,M} \end{bmatrix} \times \begin{bmatrix} P_1 \\ \vdots \\ P_M \end{bmatrix} \tag{6}$$

and $$\begin{bmatrix} P_1 \\ \vdots \\ P_M \end{bmatrix}$$

is the measured multiplexed transmission spectra intensity of light for each channel as described herein. Sensing matrix A will be determined by Eq. (4) with a given L+J parameters of film stack structure. Thus, a reconstruction error may be expressed, in some implementations, as a difference between the reconstructed spectrum and the target spectrum or |P−Ax|. Accordingly, for a given set of L+J parameters, the reconstruction error measures a performance of the given parameters and an optimal set of L+J parameters is obtained so as to achieve minimum error between reconstructed spectra and target spectra. Using an algorithm, such as a genetic algorithm, an evolution algorithm, or other global searching algorithm, a minimum value for equation |P−Ax| is obtained by searching an optimized L+J parameters, i.e. the filter stack layers. Once a desired minimum value for equation |P−Ax| is obtained, the final values of the film thicknesses that provide this minimum value then are used as the actual film thicknesses of the spectrometer to be fabricated, as described herein with respect to FIGS. 1-4.

Figure 6:
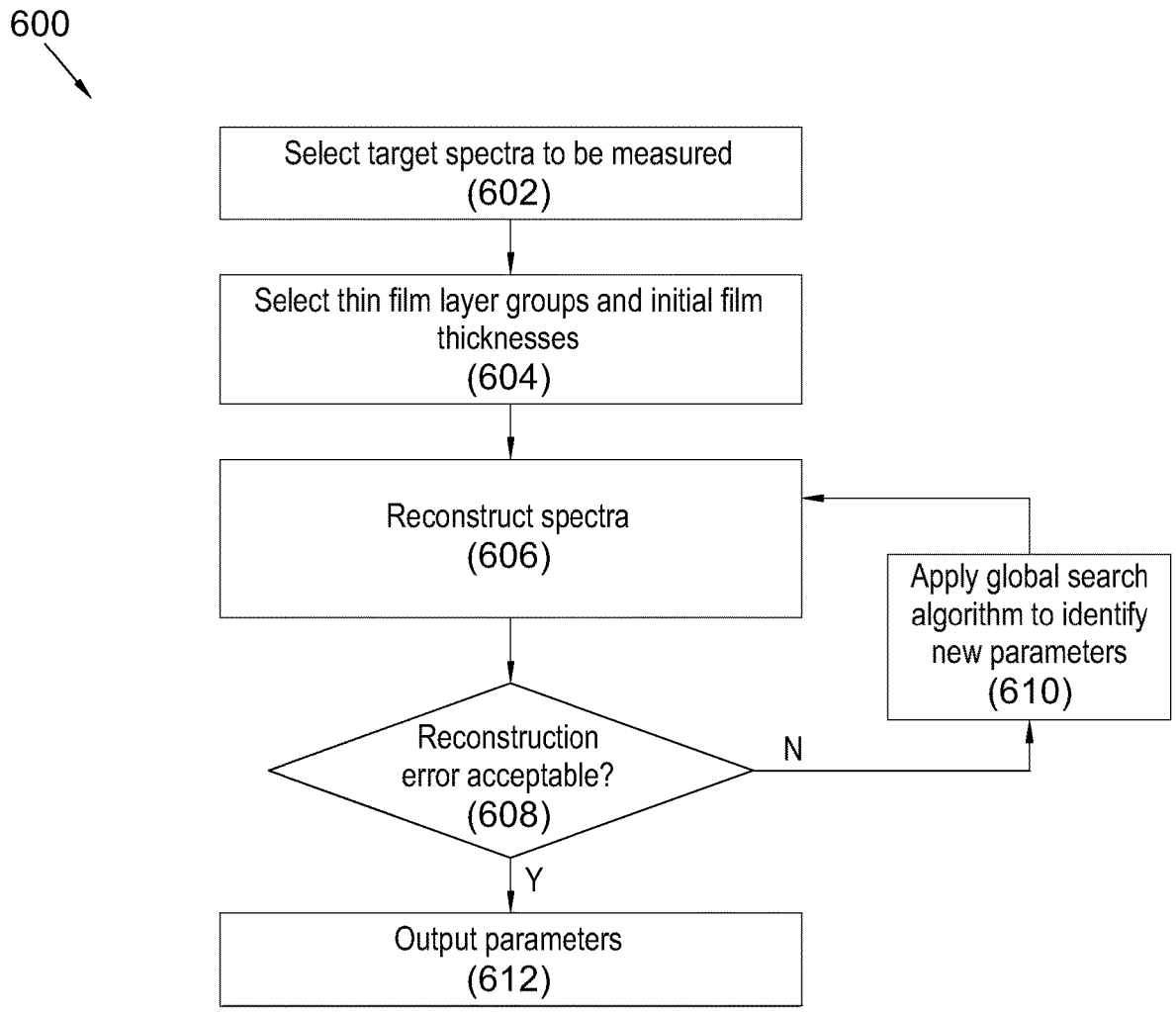
FIG. 6 is flowchart illustrating an exemplary process for optimizing a filter stack structure.

FIG. 6 is a flow chart that illustrates the design process (600) for the spectrometer. The process 600 may be performed by a data processing apparatus executing computer readable instructions stored on computer readable medium. In a first step (602), a set of target spectra to be measured by the spectrometer is selected. Subsequently, an initial set of L+J parameters (the filter stacks structure including their grouping and thin film thicknesses) are selected (604). Using these initial parameters, the transfer spectral response for each channel of the spectrometer may be determined. With each different spectrum from the target spectra, each channel of spectrometer may be used to measure the power of multiplexing different wavelengths, and the original spectra can be reconstructed (606) from the measured power. An iteration algorithm (e.g., a least squares algorithm) may be used to evaluate the performance of the spectrometer and update the channels' specifications. As part of the iteration algorithm, a reconstruction error is calculated (608) and determined whether the reconstruction error is an acceptable value. For instance, the reconstructions error may be calculated as a difference between the reconstructed spectra from each channel and the original target spectra. If the difference is above a predefined threshold, the reconstruction error is not acceptable, whereas if the difference is below the predefined threshold, the reconstruction error is acceptable. If the performance is within an acceptable level, the output parameters (the L and J parameters and thicknesses) associated with the spectrometer design are output (612). Using the output parameters, the filter structure may be fabricated. If the performance is not within an acceptable level, a global algorithm may be applied to generate another set of filter structure parameters (612). The evaluation of the spectrometer performance and revising of filter structure parameters then is repeated again until the reconstruction error is reduced to an acceptable level.

Figure 7A:
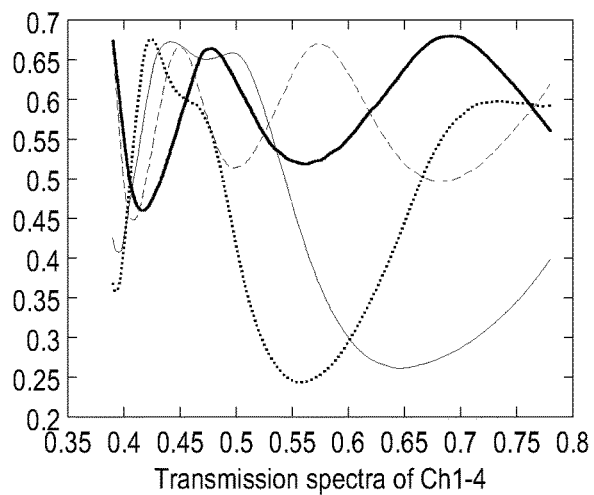
FIGS. 7A-7D are plots that show the simulated reconstructed transmission spectra of the 16 different channels of a spectrometer device having the configuration shown in FIG. 2.
Figure 7B:
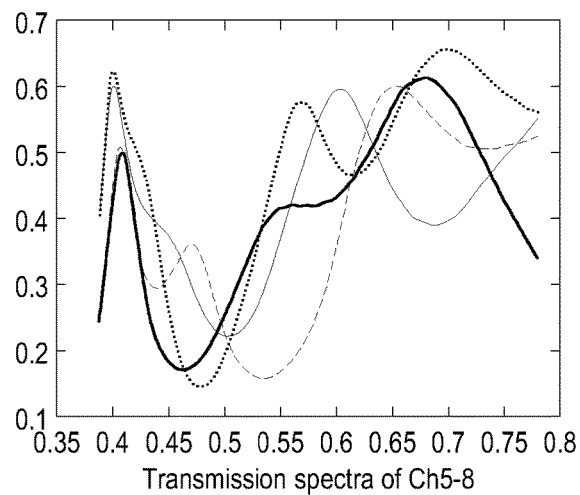
Figure 7C:
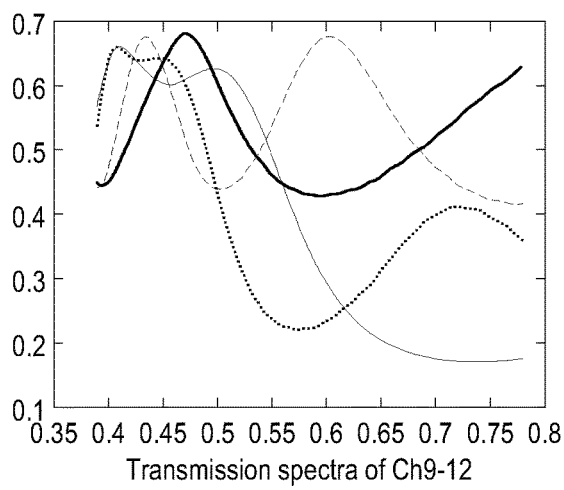
Figure 7D:
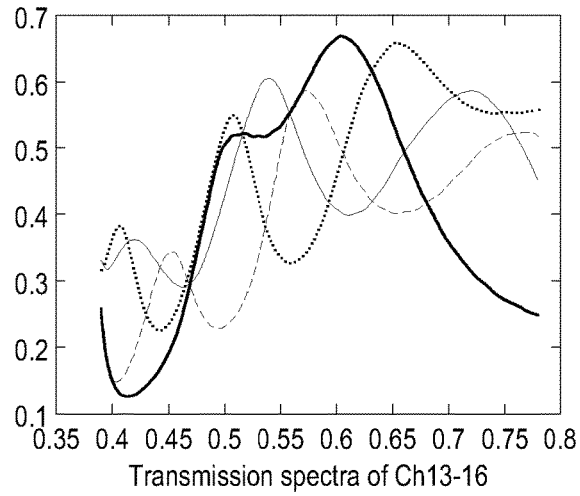

FIGS. 7A-7D are plots that show the simulated reconstructed transmission spectra of the 16 different channels of a spectrometer device having the configuration shown in FIG. 2, in which the dielectric film layers of each filter stack include $SiO_2$ and $TiO_2$. FIG. 7A shows the reconstructed spectra for channels 1-4, FIG. 7B shows the reconstructed spectra for channels 5-8, FIG. 7C shows the reconstructed spectra for channels 9-12, and FIG. 7D shows the reconstructed spectra for channels 13-16. When compared against the original spectra, the reconstructed spectra show good agreement. Multiple color plates may be used as light sources for the spectrometer model in order to simulate reconstructed spectra. For instance, in some implementations, 2, 3, 4, 5, 6, 7, 8, 9, 10, 15, 20, 21, 22, 23, 24, or 25 color plates, among other numbers of color plates may be used as light sources to perform the simulation and obtain the reconstructed spectra.

Figure 8A:
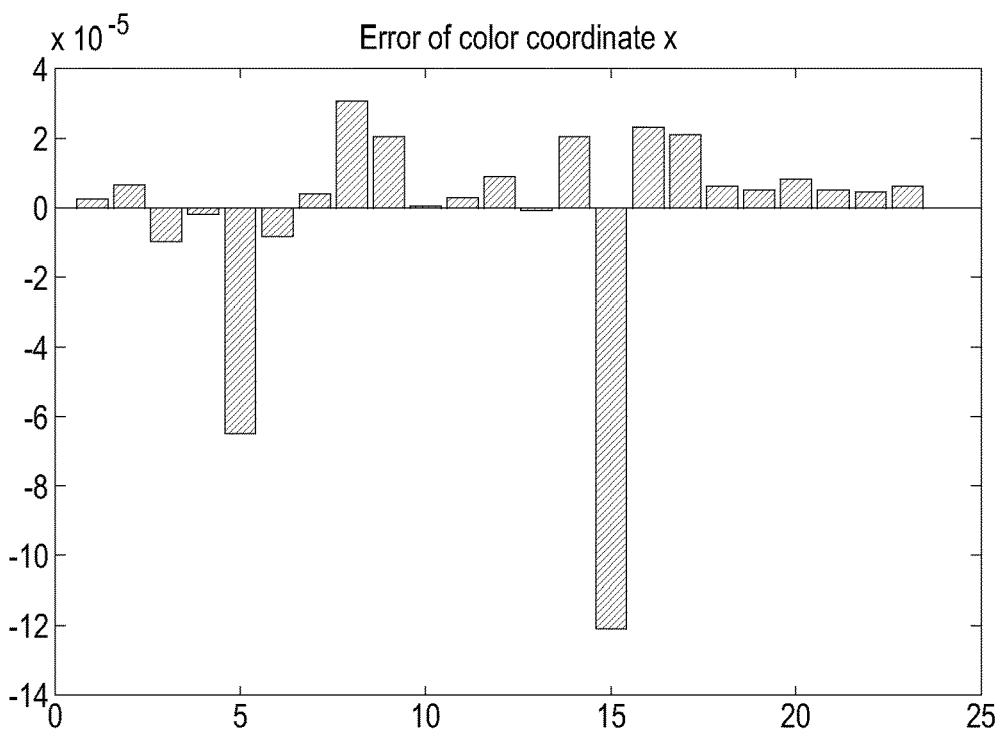
FIG. 8A is a plot illustrating reconstructed color error by comparing the reconstructed X-color coordinate and an original X-color coordinate for multiple different color plates
Figure 8B:
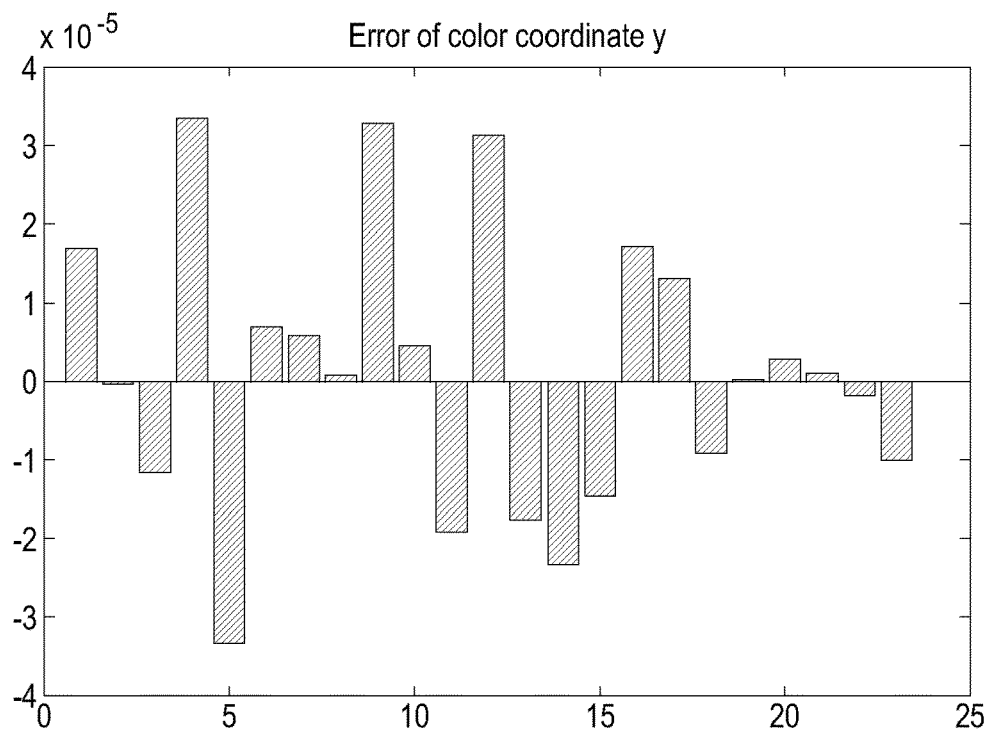
FIG. 8B is a plot illustrating reconstructed color error by comparing the reconstructed Y-color coordinate and an original Y-color coordinate for multiple different color plates.

FIG. 8A is a plot illustrating reconstructed color error by comparing the reconstructed X-color coordinate and an original X-color coordinate for multiple different color plates. FIG. 8B is a plot illustrating reconstructed color error by comparing the reconstructed Y-color coordinate and an original Y-color coordinate for multiple different color plates. For instance, in the examples of FIG. 8A and 8B, 23 color plates were used for the original color coordinates for a spectrometer model having the configuration shown in FIGS. 2-3, in which the dielectric film layers of each filter stack include $SiO_2$ and $TiO_2$. As shown in the plots, the error in both the X and Y-color coordinates for the 23 different color samples were all below $5\times10^{-3}$, illustrating good agreement with the original color plates and a reconstruction error that is below the detectability of human eyes.

Embodiments of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions, encoded on a computer program carrier, for execution by, or to control the operation of, data processing apparatus. The carrier may be a tangible non-transitory computer storage medium. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

In some cases, the processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. The essential elements of a computer are a central processing unit for executing instructions and one or more memory devices for storing instructions and data. The central processing unit and the memory can be supplemented by, or incorporated in, special-purpose logic circuitry.

Generally, a computer will also include, or be operatively coupled to receive data from or transfer data to one or more mass storage devices. The mass storage devices can be, for example, magnetic, magneto-optical, or optical disks, or solid state drives. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

A number of implementations have been described. Nevertheless, it will be understood that various modifications may be made without departing from the spirit and scope of the invention. Accordingly, other embodiments are within the scope of the following claims.

The invention claimed is:

1. A spectrometer device comprising:
a substrate comprising a plurality of light detector elements arranged in an array on the substrate;
a first filter layer on the substrate, wherein the first filter layer comprises multiple groups of adjacent filter stacks, each filter stack in the first filter layer comprising multiple dielectric films of alternating refractive index; and
a second filter layer on the first filter layer, wherein the second filter layer comprises multiple groups of adjacent filter stacks, each filter stackin the second filter layer comprising multiple dielectric films of alternating refractive index,
wherein each filter stack in the second filter layer is aligned with both a corresponding filter stack in the first filter layer and a corresponding light detector element to define a respective photodetector channel,
wherein each photodetector channel comprises a different optical transmission spectrum
wherein each group of adjacent filter stacks in the first filter layer comprises a same first plurality of different filter stacks,
wherein each group of adjacent filter stacks in the second filter layer comprises a same second plurality of different filter stacks,
wherein each filter stack within each first plurality of different filter stacks comprises a same number of stacked dielectric films, and is formed with the same dielectric film material,
wherein each filter stack within each second plurality of different filter stacks comprises a sa me number of stacked dielectric films, and is formed with the same dielectric film material,
wherein each filter stack within the first plurality of different filter stacks has different dielectric film thicknesses from the other filter stacks within the first plurality of different filter stacks and each filter stack within the first plurality of different filter stacks is arranged horizontally to form a portion of the first filter layer,
wherein each filter stack within the second plurality of different filter stacks has different dielectric film thicknesses from the other filter stacks within the second plurality of different filter stacks and each filter stack within the second plurality of different filter stacks is arranged horizontally to form a portion of the second filter layer.

2. The spectrometer of claim 1, wherein the dielectric film thicknesses of each filter stack in the first filter layer and in the second filter layer are refined for at least one predefined spectral source.

3. The spectrometer of claim 1, wherein the multiple groups of filters stacks of the second filter layer comprise multiple pluralities of identical filter stacks, and wherein the multiple groups of filter stacks of the first filter layer comprise multiple pluralities of identical filter stacks.

4. The spectrometer of claim 1, wherein each filter stack within the first filter layer consists of two dielectric film layers.

5. The spectrometer of claim 4, wherein the two dielectric film layers of each filter stack within the first filter layer comprise a low refractive index layer and a high refractive index layer.

6. The spectrometer of claim 1, wherein each filter stack within the second filter layer consists of two dielectric films.

7. The spectrometer of claim 6, wherein the two dielectric films of each filter stack within the second filter layer comprise a low refractive index layer and a high refractive index layer.

8. A method of forming a spectrometer device, the method comprising:
predefining a plurality of filter stacks, wherein each filter stack comprises a plurality of dielectric films, each dielectric film of the plurality of dielectric films having a corresponding initial film thicknesses;
updating a film thickness of each dielectric film of each filter stack in a spectrometer model, wherein the spectrometer model comprises the plurality of filter stacks arranged into a first filter layer and a second filter layer on the first filter layer,
wherein each filter stack within the second filter layer is aligned with a corresponding filter stack in the first filter to define respective channels; and
fabricating the spectrometer device according to the spectrometer model comprising the updated dielectric film thicknesses, wherein fabricating the spectrometer device comprises:
providing a substrate comprising a plurality of light detector elements arranged in an array on the substrate;
forming the first filter layer on the substrate; and
forming the second filter layer above the first filter layer,
wherein each filter stack in the second filter layer is aligned with both a corresponding filter stack in the first filter layer and a corresponding light detector element to define a respective photodetector channel, and
wherein each photodetector channel is configured to have a different optical transmission spectrum,
wherein forming the first filter layer comprises:
forming a plurality of adjacent first filter stacks, each first filter stack consisting of the same structure; and
after forming the plurality of adjacent first filter stacks, forming a plurality of adjacent second filter stacks, each second filter stack consisting of the same structure as each other second filter stack and comprising a different structure from the plurality of the adjacent first filter stacks,
wherein each of the plurality of filter stacks in the first filter layer comprises a same first plurality of different filter stacks,
wherein each of the plurality of filter stacks in the second filter layer comprises a same second plurality of different filter stacks,
wherein each filter stack within the first plurality of different filter stacks has different dielectric film thicknesses from the other filter stacks within the first plurality of different filter stacks and each filter stack within the first plurality of different filter stacks is arranged horizontally to form a portion of the first filter layer, and
wherein each filter stack within the second plurality of different filter stacks has different dielectric film thicknesses from the other filter stacks within the second plurality of different filter stacks and each filter stack within the second plurality of different filter stacks is arranged horizontally to form a portion of the second filter layer.

9. The method of claim 8, wherein each photodetector channel is configured to have a different optical transmission spectrum.

10. The method of claim 8, wherein forming the first filter layer comprises:
- after forming the plurality of second filter stacks, forming a plurality of third filter stacks, each third filter stack consisting of the same structure as each other third filter stack and comprising a different structure from the plurality of first filter stacks and the plurality of second filter stacks; and
- after forming the plurality of third filter stacks, forming a plurality of fourth filter stacks, each fourth filter stack consisting of the same structure as each other fourth filter stack and comprising a different structure from the plurality of first filter stacks, the plurality of second filter stacks, and the plurality of third filter stacks.

11. The method of claim 8, wherein forming the second filter layer comprises:
- forming a plurality of third filter stacks, each third filter stack consisting of the same structure as each other third filter stack and comprising a different structure from the plurality of first filter stacks and the plurality of second filter stacks,
- wherein each third filter stack is arranged on a different filter stack structure of the first filter stack layer; and
- after forming the plurality of third filter stacks, forming a plurality of fourth filter stacks, each fourth filter stack consisting of the same structure as each other fourth filter stack and comprising a different structure from the plurality of first filter stacks, the plurality of second filter stacks, and the plurality of third filter stacks,
- wherein each fourth filter stack is arranged on a different filter stack structure of the first filter stack layer.

12. The method of claim 8, wherein updating the thickness of each dielectric film of each filter stack in the spectrometer model comprises:
- selecting a source transmission spectra; and
- refining the thickness of each dielectric film of each filter stack based on the selected source transmission spectra.

13. The method of claim 8, wherein each filter stack of the predefined plurality of filter stacks consists of two dielectric films.

14. The method of claim 13, wherein the two dielectric films of each filter stack within the second filter layer comprise a low refractive index layer and a high refractive index layer.

* * * * *